(12) United States Patent
Kastenbaum et al.

(10) Patent No.: US 11,874,420 B2
(45) Date of Patent: Jan. 16, 2024

(54) VISUALIZING AND EDITING A REPRESENTATION OF A GEOLOGICAL SURFACE

(71) Applicant: Halliburton Energy Services, Inc., Houston, TX (US)

(72) Inventors: Martin Kastenbaum, Houston, TX (US); William David Bethancourt, Houston, TX (US); Yang Miao, Cypress, TX (US); Jeremy Combs, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 636 days.

(21) Appl. No.: 17/049,541

(22) PCT Filed: Aug. 21, 2018

(86) PCT No.: PCT/US2018/047352
§ 371 (c)(1),
(2) Date: Oct. 21, 2020

(87) PCT Pub. No.: WO2020/040751
PCT Pub. Date: Feb. 27, 2020

(65) Prior Publication Data
US 2021/0278559 A1 Sep. 9, 2021

(51) Int. Cl.
*G01V 1/34* (2006.01)
*G01V 99/00* (2009.01)
(Continued)

(52) U.S. Cl.
CPC .............. *G01V 1/345* (2013.01); *E21B 7/04* (2013.01); *E21B 47/12* (2013.01); *G01V 99/005* (2013.01);
(Continued)

(58) Field of Classification Search
CPC .. G01V 1/345; G01V 99/005; G01V 2210/64; G01V 2210/66; G01V 2210/74; E21B 2200/20
See application file for complete search history.

(56) References Cited

U.S. PATENT DOCUMENTS

2010/0094559 A1 4/2010 Contreras et al.
2012/0136576 A1* 5/2012 Davis ................. G01V 99/00
703/2

(Continued)

FOREIGN PATENT DOCUMENTS

EP 0745870 A2 12/1996

OTHER PUBLICATIONS

Loe, "A sinusoidal polynomial spline and its Bezier blended interpolant", Journal of computational and Applied Mathematics, vol. 71 (Jul. 27, 1996), pp. 383-393. (Year: 1996).*

(Continued)

*Primary Examiner* — Sing-Wai Wu
(74) *Attorney, Agent, or Firm* — DeLizio, Peacock, Lewin & Guerra, LLP

(57) ABSTRACT

A cross sectional representation of a geological surface is displayed on a display screen. A segment of the cross-sectional representation is edited, and a pseudo log of formation properties based on the edited segment is displayed on the display screen. A determination is made whether formation properties associated with the pseudo log match actual formation properties measured during drilling of a well and a signal is output indicative of the match. A drill operator may use a structural model determined based on the edited geological surface to drill for hydrocarbons in the formation.

20 Claims, 9 Drawing Sheets

(51) Int. Cl.
 E21B 7/04 (2006.01)
 E21B 47/12 (2012.01)
(52) U.S. Cl.
 CPC ...... *E21B 2200/20* (2020.05); *G01V 2210/64* (2013.01); *G01V 2210/66* (2013.01); *G01V 2210/74* (2013.01)

(56) References Cited

U.S. PATENT DOCUMENTS

| | | | |
|---|---|---|---|
| 2012/0173216 A1* | 7/2012 | Koepsell | E21B 49/00 703/6 |
| 2015/0292266 A1* | 10/2015 | Johnson | E21B 7/04 700/275 |
| 2016/0139298 A1 | 5/2016 | Singh et al. | |
| 2016/0179996 A1 | 6/2016 | Ramsay | |
| 2017/0115412 A1 | 4/2017 | Pixton | |
| 2018/0067229 A1* | 3/2018 | Li | G01V 99/005 |
| 2018/0252101 A1* | 9/2018 | Bartetzko | E21B 44/00 |

OTHER PUBLICATIONS

PCT Application Serial No. PCT/US2018/047352, International Search Report, dated May 3, 2019, 4 pages.
PCT Application Serial No. PCT/US2018/047352, International Written Opinion, dated May 3, 2019, 7 pages.

* cited by examiner

VISUALIZING AND EDITING A REPRESENTATION OF A GEOLOGICAL SURFACE

TECHNICAL FIELD

The disclosure generally relates to the field of earth or rock drilling, and more particularly to visualizing and editing a representation of a geological surface.

BACKGROUND

Conventional logging techniques such as logging while drilling (LWD) and/or wireline tools are used to measure formation properties of a well drilled in a geological formation. In some cases, a plurality of wells is drilled in the formation and formation properties measured in each of the plurality of wells. The measured formation properties are used to determine a structural model. The structural model describes formation properties in between the plurality of wells which were not actually measured. The formation properties in between the plurality of wells are calculated based on applying algorithms and mathematical equations determined from an analysis of characteristics associated with many formations to the formation properties measured in the plurality of wells.

BRIEF DESCRIPTION OF THE DRAWINGS

Embodiments of the disclosure may be better understood by referencing the accompanying drawings.

DESCRIPTION OF EMBODIMENTS

Overview

Figure 1:
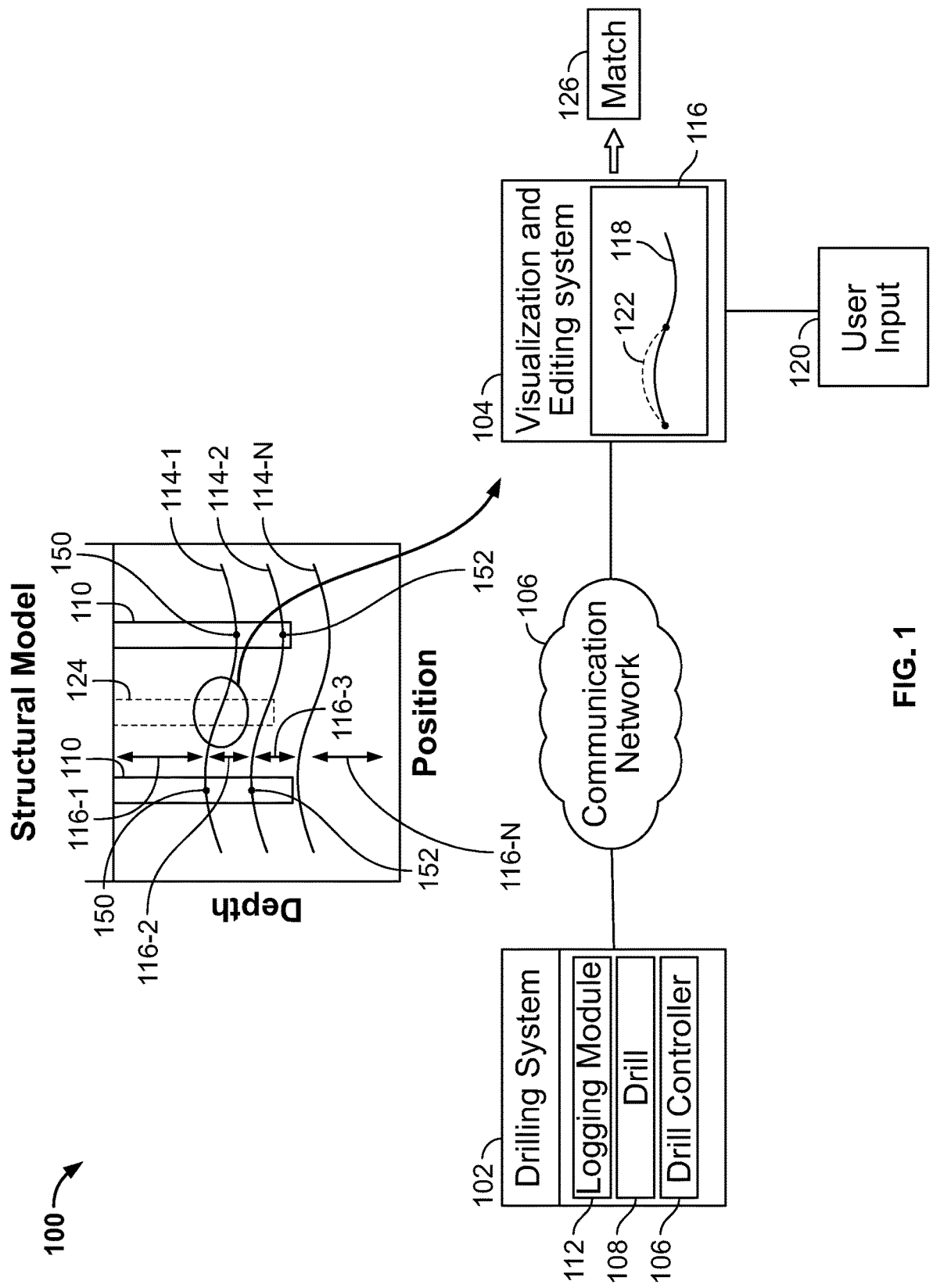
FIG. 1 illustrates an example arrangement of a visualization and editing system for determining a geological surface of a formation.

Formation properties associated with the structural model can be arranged into geological surfaces. The geological surfaces represent upper and/or lower boundaries of a formation layer in the formation having similar formation properties such as resistivity, gamma, porosity, and/or density sufficiently distinctive.

Embodiments described herein are directed to a method, apparatus, and system for editing a representation of the geological surface to determine a more accurate representation of the geological surface. The geological surface may be determined by a visualization and editing system which facilitates edits to a segment of the geological surface shown on a display screen of a computer system and determination of a pseudo log associated with the edits that is compared to actual formation properties that are measured when drilling a well in the formation. The pseudo log may be an estimate of formation properties as a function of depth that would be measured in the formation if the formation was to have a geological surface in the form of the edited geological surface. If the pseudo log matches the actual formation properties, then the edited geological surface may be a better representation of the geological surface.

To facilitate editing of the geological surface, a cross-sectional representation of the geological surface is shown on a display screen. A user can define one or more of a node line and control point on the cross-sectional representation. The node line may divide the cross-sectional representation into a left half and a right half and the control point may initially identify a highest point on the cross-sectional representation. The user adds spline points along the cross-sectional representation and edits a segment of the cross-sectional representation between spline points. The edit may take a form of a stretching of the segment in one or more directions.

The edited segment may be interpolated with a remainder of the geological surface which was not edited to form an edited geological surface. Kriging is a well-known interpolation process to optimize smoothness of a surface which in this case is the edited geological surface. The edited geological surface may be shown on the display screen as a three-dimensional representation which is updated in real-time as the cross-sectional representation is edited. A pseudo log is also determined based on the edited geological surface and associated with a location a well is to be drilled. Then, when the well is actually drilled at the location, formation properties may be measured in the well and compared to the pseudo log. A match indicates that the edited geological surface is an accurate representation of the geological surface and can be used to geosteer a drill bit.

Example Illustrations

The description that follows includes example systems, methods, techniques, and program flows that embody aspects of the disclosure. However, it is understood that this disclosure may be practiced without these specific details. For instance, this disclosure refers to visualizing and editing a geological surface of a formation. Other instances, well-known instruction instances, protocols, structures and techniques have not been shown in detail in order not to obfuscate the description.

FIG. 1 illustrates an example arrangement for visualizing and editing a geological surface associated with a structural model of a formation 100 in accordance with various embodiments described herein. The arrangement may include a drilling system 102 and visualization and editing system 104 coupled together via a communication network 106. The communication network 106 may facilitate communication between the drilling system 102 and visualization and editing system 104 and take the form of a wired or wireless network, among other arrangements.

The drilling system 102 may facilitate drilling in a formation 100. The drilling system 102 may have a drill controller 106 for controlling direction of a drill 108 used to drill a well 110 in the formation. Additionally, the drilling system 102 may have a logging module 112 for logging formation measurements in the well 110. Logging methods may take various forms including logging while drilling (LWD) and wireline tools among others. The LWD method may involve performing formation measurements though use of tools integrated with drilling apparatus while the wireline tools may involve lowering tools into the well 110 after the drilling apparatus is removed and performing the formation measurements.

The drilling system 102 or some other system may determine a structural model which describes formation properties of the formation 100. The structural model may be defined by algorithms and mathematical equations determined from analysis of characteristics associated with many formations and the formation properties measured in a plurality of wells 110 drilled in the formation. Further, the formation properties may be organized into geological surfaces. A geological surface identifies upper and/or lower boundaries of a formation layer in the formation having similar formation properties such as resistivity, gamma, porosity, and density sufficiently distinctive. The geological surfaces are illustrated in the formation 100 as geological surfaces 114-1 . . . N and formation layers 116-1 . . . N in between the geological surfaces 114-1 . . . N. Each of the surfaces and/or formation layers may represent a given formation property such that a same surface and/or formation layer may have a similar value of the given formation property. The surfaces are plotted as a function of depth and position. For example, the depth may be a true vertical depth (TVD) and the position may be a spatial position with respect to a wellhead or alternatively a measured depth (MD). Other variations in illustration are also possible.

An inflection or surface point may indicate a point or region of the formation having certain formation properties. The geological surface is constructed based on connecting inflection and/or surface points measured in each of the plurality of wells with similar formation properties. Inflection points 150 may have similar geological properties. Likewise, inflection points 152 may have similar geological properties. Geological surface 114-1 results from connecting inflection points 150 and geological surface 114-2 results from connecting inflection points 152. Other variations are also possible.

A visualization and editing system 104 may be used to improve accuracy of representation of the geological surface. The visualization and editing system 104 may be a computer system with a display screen 116 for displaying the geological surface 118 (or a portion thereof) and a user input 120 for facilitating edits to the geological surface. For example, the geological surface 118 which is displayed may be the geological surface 114-1 or a portion thereof. The user input 120 such as a mouse, keyboard, or touchscreen input may facilitate receiving input from the user which is reflected on the display screen 116. The display 116 and user input 120 may be integrated with the computer system or part of a separate stand-alone portable computing device that is coupled to the computer system.

The editing may be an interactive process of receiving user input via the input device 120 to deform a segment 122 of the geological surface shown on the display screen 116 shown as a dotted line to produce an edited geological surface. The visualization and editing system 104 may calculate a pseudo log associated with the edited geological surface. The pseudo log may be an estimate of formation properties as a function of depth that would be measured in the formation if the formation was to have geological surfaces in the form of the edited geological surface. The pseudo log may be associated with where a well 124 is to be drilled.

The well 124 may be actually drilled and the logging module 112 may generate actual formation measurements of formation properties in the formation. The formation properties measured may be provided to the visualization and editing system 104 and compared to the pseudo log. If the pseudo log matches the actual formation properties measured, then the edited geological surface may be a more accurate representation of the geological surface in the formation 100. The display screen 116 may provide an indication 126 of the edited geological surface being a more accurate representation of the geological surface. The indication 126 may be an audio, visual, and/or audio-visual indication.

Figure 2:
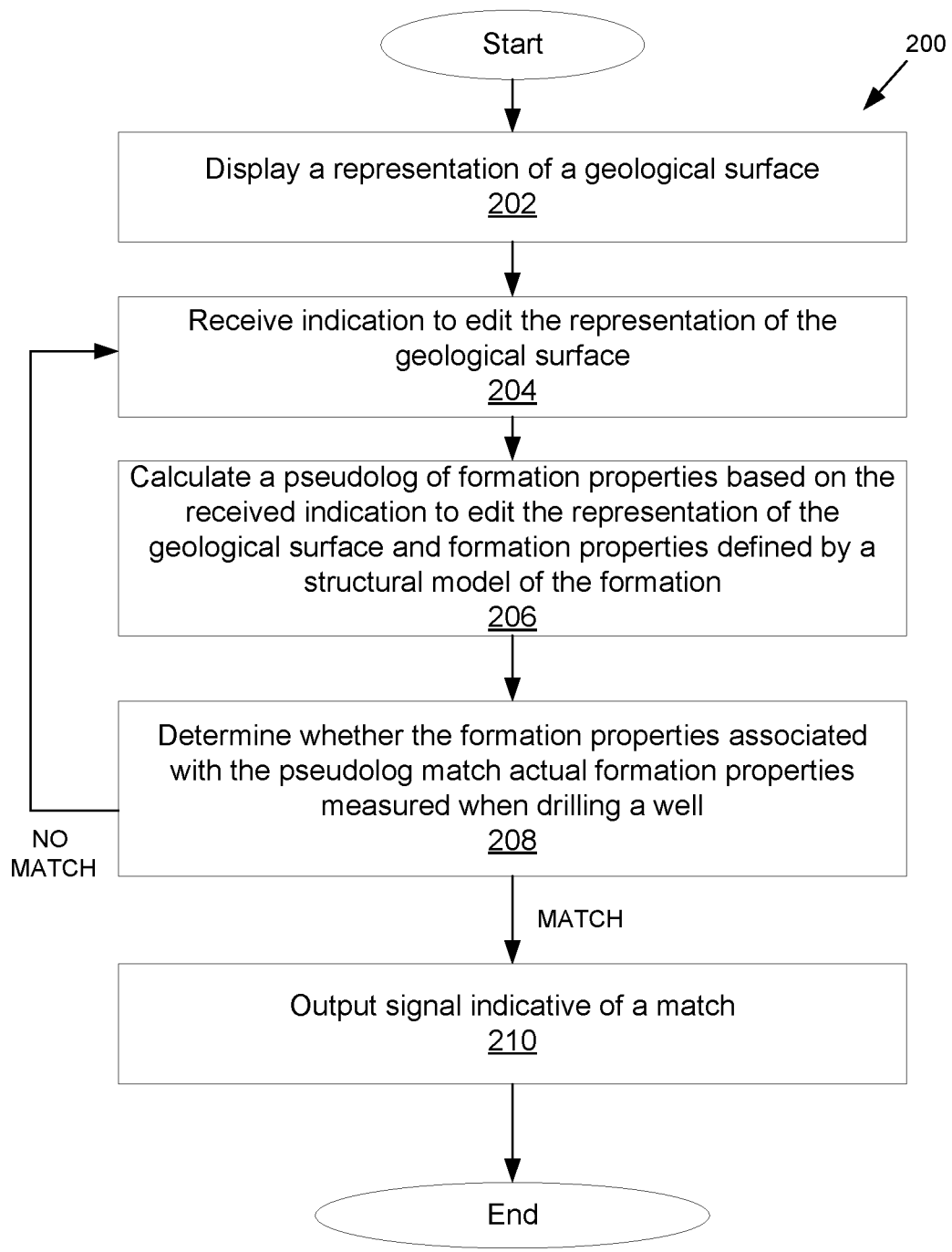
FIG. 2 is an example flow chart of functions associated with determining the geological surface of the formation.

FIG. 2 is an example flow chart of functions 200 associated with visualizing and editing a geological surface to determine a more accurate representation of the geological surface in a formation. Functions may be performed by the system of FIG. 1 among other arrangements.

Briefly, at 202, a representation of a geological surface associated with a formation is displayed on a display screen of the computer system. At 204, an indication to edit the representation of the geological surface is received. At 206, a pseudo log of formation properties is calculated based on the received indication to edit the representation of the geological surface and formation properties defined by a structural model of the formation. At 208, a determination is made whether formation properties associated with the pseudo log match actual formation properties measured when drilling a well. At 210, a signal may be output indicative of a match.

Referring, at 202, a representation of a geological surface may be displayed on a display screen of the computer system. The geological surface shown on the display screen may take a variety of forms.

Figure 3:
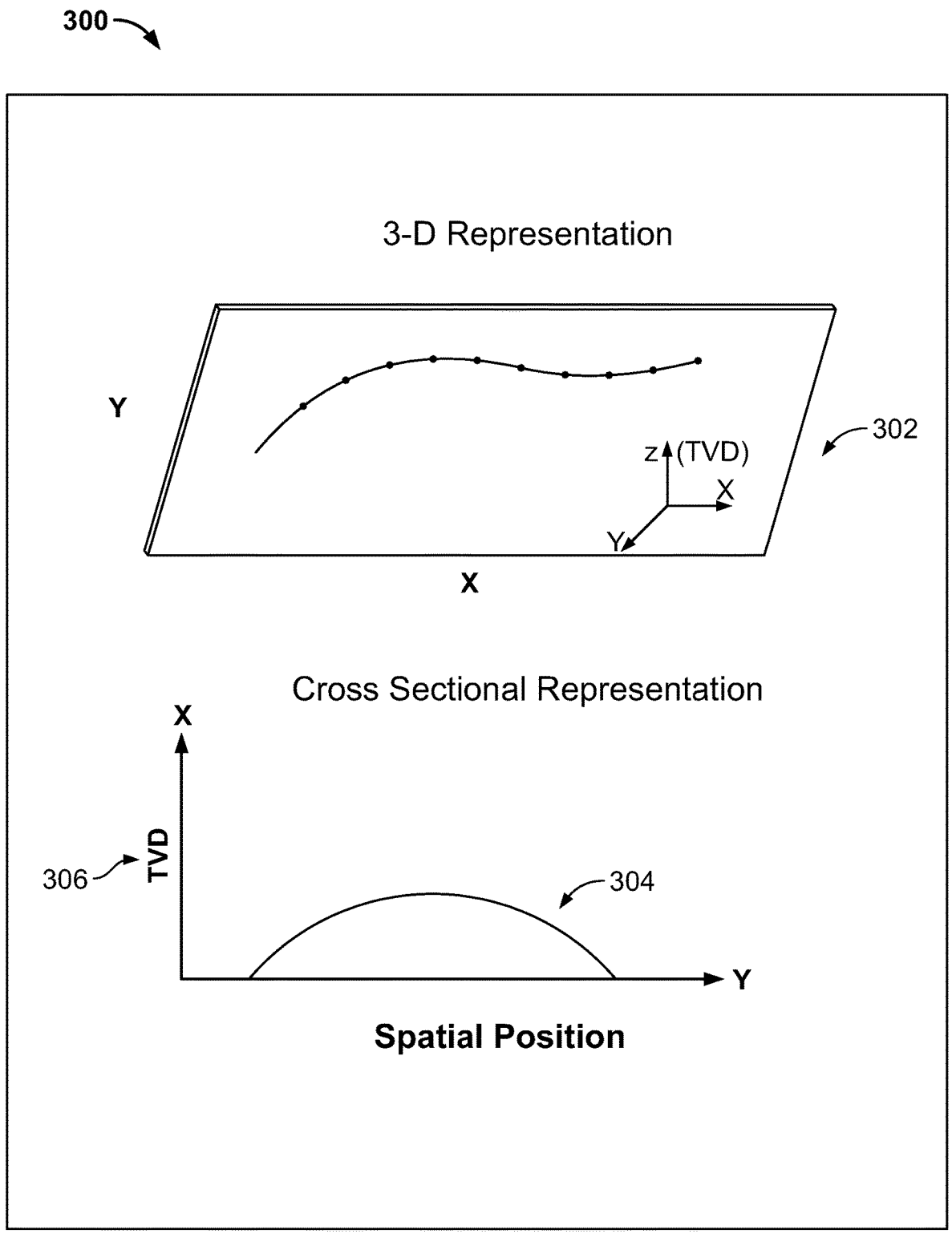
FIG. 3 illustrates an example three-dimensional and cross-sectional representation of a geological surface of the formation.

FIG. 3 illustrates examples 300 of a three-dimensional representation 302 and cross-sectional representation 304 of the geological surface. The three-dimensional representation 302 may be a grid of points in a three-dimensional space which defines the geological surface in terms of a spatial position in an X and Y direction and total vertical depth (TVD) in a Z axis. The cross-sectional representation 304 may represent a profile of the three-dimensional representation 302. An X axis 306 of the cross-sectional representation 304 may indicate total vertical depth (TVD) of the geological surface and the Y axis 308 may indicate a spatial position of the geological surface from a reference point such as a wellhead. In this regard, a flat cross-sectional representation may indicate a flat geological surface as a function of spatial position while a varying cross-sectional representation may indicate variation in the geological surface a function of depth and/or spatial position in the formation.

At 204, an indication to edit the representation of the geological surface is received. The indication to edit may be one or more inputs provided by the user via the user input device.

Figure 4:
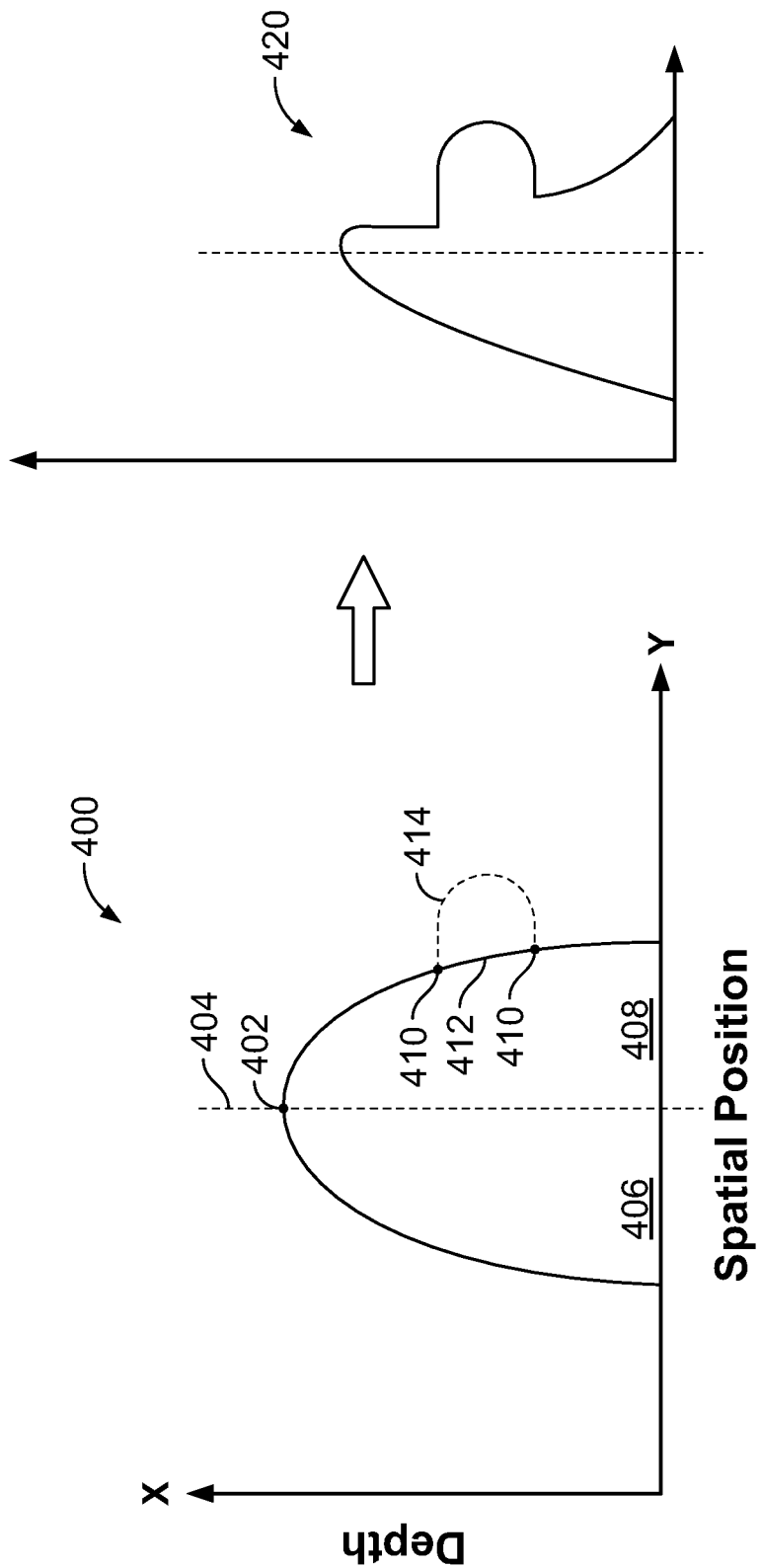
FIG. 4 illustrates an example edit to a segment of the cross-sectional representation.

FIG. 4 illustrates editing a cross-sectional representation 400 of the geological surface displayed on the display screen. To facilitate the editing, a control point 402 and node line 404 may be overlaid onto the cross-sectional representation 400. The node line 404 may divide the cross-sectional representation 400 into a left half 406 and a right half 408 and the control point 402 may initially identify a highest point on the cross-sectional representation 400. The cross-sectional representation 400 may be edited by adding spline points 410 positioned via the user input and stretching the segment 412 of the cross-sectional representation 400 between the spline points 410 to form an edited segment 414. For example, two spline points 410 may be added to the cross-sectional representation 400 and the segment 412 between the two spline points 410 may be stretched. A nature of the stretching may be calculated and shown on the display screen based on well-known curve fitting equations fit to the spline points 410. The cross-sectional representation 400 may be edited on either side or both sides of the node line 404. Further, multiple segments on the cross-sectional representation 400 may be edited.

The user input to indicate the edit may take various forms. For example, the segment 412 in between the two spline points 410 may be edited via a press of a mouse button and a drag of the segment 412 anchored at the spline points 410 to stretch the segment 412 to a desired shape shown as the edited segment 414. Release of the mouse button may fix the shape of the edited segment 414 resulting in an edited cross-sectional representation 420. As another example, the display may have touch screen capability and the user may touch the screen to redraw the segment 412. In some cases, the cross-sectional representation may be edited at multiple points by placing multiple spline points on cross sectional representation 400 and performing multiple drag operations to edit the cross-sectional representation 400 at multiple points to form the edited cross-sectional representation 420.

The edited segment may be combined with a remainder of the geological surface which was not edited to form an edited geological surface. Well known interpolation techniques such as kriging may be used to form the edited geological surface. Kriging optimizes smoothness between the edited segment and the remainder of the geological surface which was not edited to form the edited geological surface. The three-dimensional surface shown on the display screen may be updated with the edited geological surface.

Figure 5:
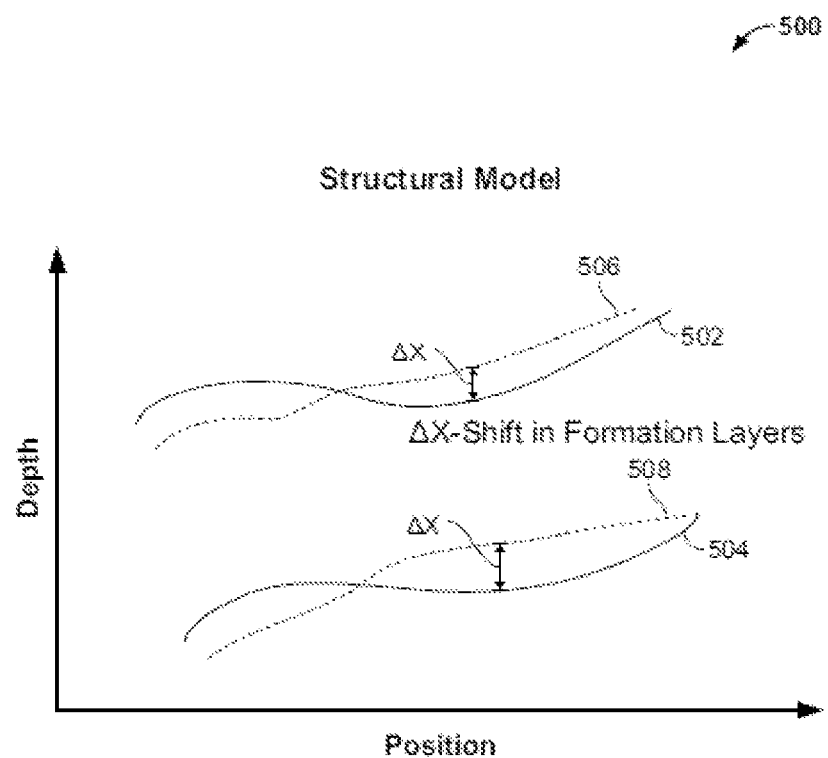
FIG. 5 illustrates an update to a structural model of a formation based on the edit to the segment of the cross-sectional representation.

FIG. 5 illustrates an update to a structural model 500 based the kriging. The structural model 500 shows a geological surface 502 and geological surface 504 as solid lines as a function of a depth and position. The depth may be a true vertical depth (TVD) or alternatively a measured depth (MD) and the position may be a spatial position. A segment of a representation of the geological surface 502 may have been edited in accordance with step 204. Because of editing a segment of a representation of the geological surface 502 and subsequent kriging with a remainder of the geological surface 502, the geological surface 502 may take the form of edited geological surface 506 shown as a dotted line in the structural model 500. The depth of the geological surface 502 may be shifted by an amount represented by delta to form the edited geological surface 506. As a result of this shift, the structural model 500 may be updated so that formation layers above and below the geological surface 506 are also shifted by the delta or some function of delta and consequently this shift results in geological surface 504 being shifted by the delta or some function of the delta and represented as geological surface 508.

At 206, a pseudo log of formation properties is calculated based on the received indication to edit the representation of the geological surface and formation properties defined by the updated structural model. The pseudo log is an estimate of the formation properties that would be measured in drilling a well in the formation at a given location if the formation was to have geological surfaces in the form of the edited geological surface.

Figure 6:
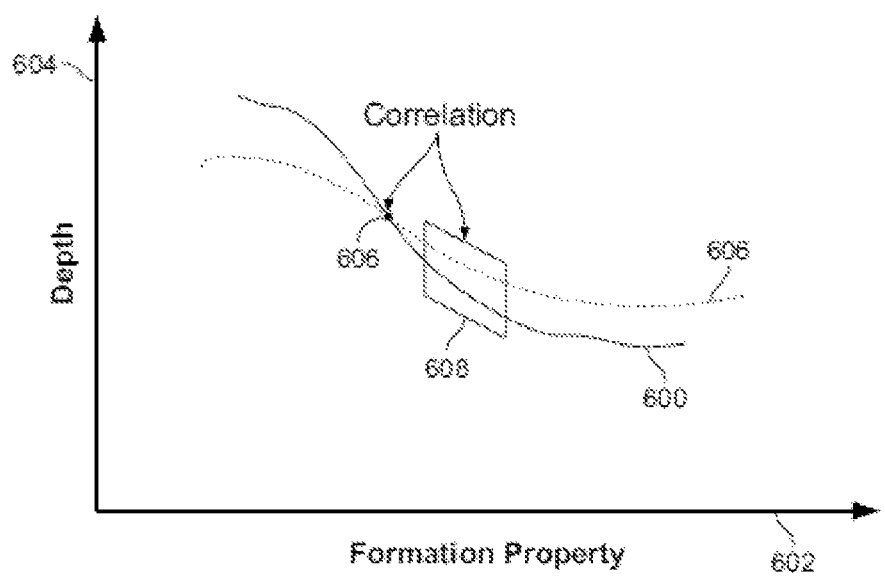
FIG. 6 illustrates a pseudo log associated with the edit to the segment of the cross-sectional representation.

FIG. 6 illustrates an example of the pseudo log 600. The pseudo log 600 may show formation properties for the edited geological surface on a horizontal axis 602 as a function of depth on a vertical axis 604. The formation properties may be, for example, resistivity as shown but also could be density, porosity, or gamma. The depth may be a TVD or MD.

At 208, a determination is made whether the formation properties associated with the pseudo log match actual formation properties measured when drilling the well associated with the pseudo log. The actual formation properties measured may be indicated by the logging module during the drilling process and shown in FIG. 6 as an actual log 606. If there is a match, then the edited geological surface may be a better representation of geological surface. The match may be characterized by a correlation greater than a given amount between the actual formation measurements and pseudo log. For example, the correlation may be that the resistivity of the pseudo log matches the resistivity of the formation properties measured at a given depth 606 or range of depths 608. The match may be when the resistivity of the pseudo log equals the resistivity of the formation properties measured at a given depth 606 or range of depths 608 or when the resistivity of the pseudo log and the resistivity of the formation properties measured at a given depth 606 or range of depths 608 is within a certain threshold level. The match may be characterized in other ways as well f there is no match, then the cross-sectional representation may be further edited by repeating one or more of steps 204-208 until there is a match.

Figure 7:
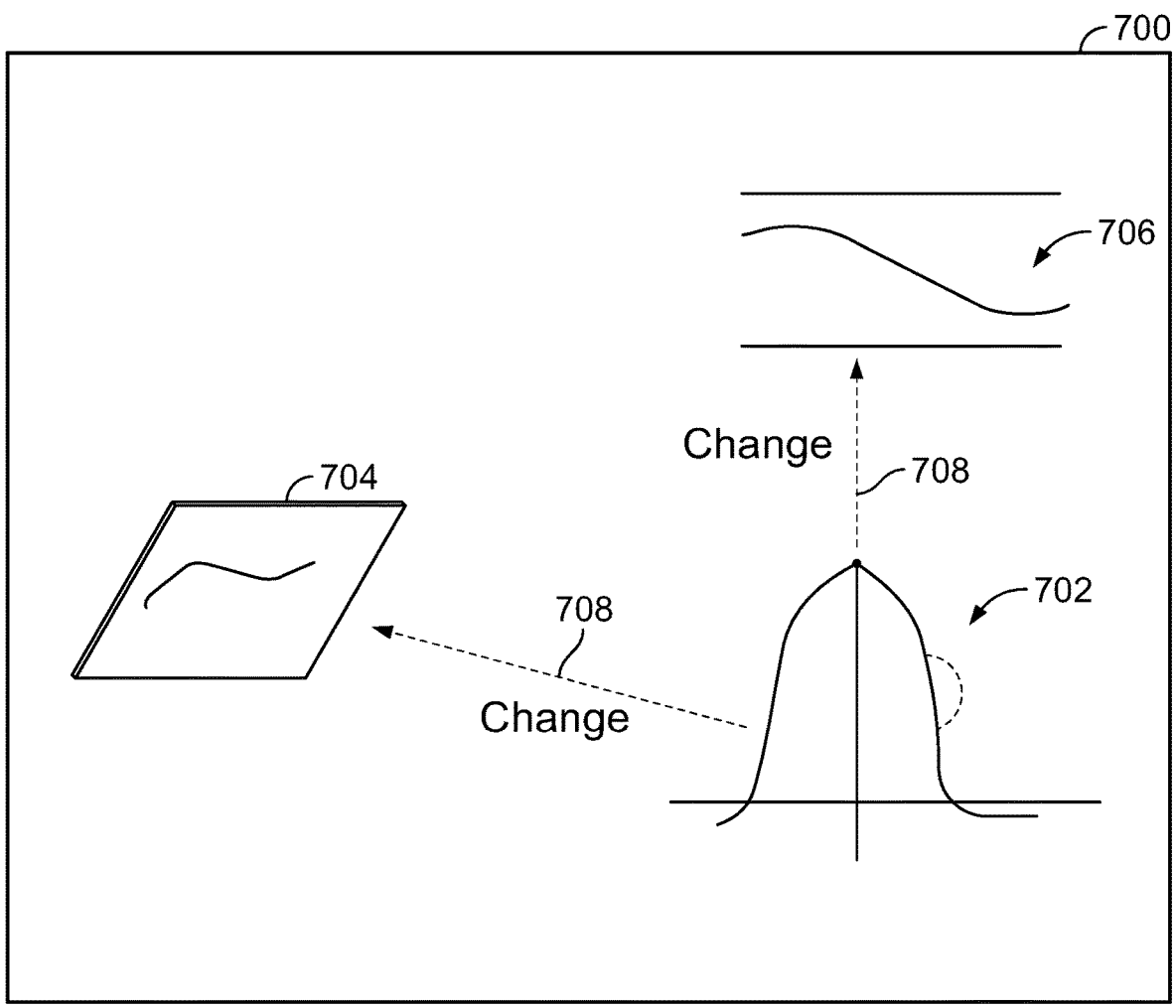
FIG. 7 illustrates a dynamic nature associated with the edit to the segment of the cross-sectional representation of the geological surface.

FIG. 7 further illustrates the dynamic nature associated with the editing process. A view 700 may present a cross-sectional representation 702 of a geological surface, a three-dimensional representation 704 of the geological surface, and a pseudo log 706 associated with the cross-sectional representation 702 together on a display screen such as in a single window or plurality of windows presented together.

The dynamic nature associated with the editing process is illustrated in the sense that an edit to the cross-sectional representation 702 may cause the three-dimensional representation 704 and/or pseudo log 706 to change in real time based on real time edits to the cross-sectional representation 702. This change in real time is illustrated with arrows 708 which show an edit to the cross-sectional representation 702 causing a change to the three-dimensional representation 704 and the pseudo log 706 in real time. In this regard, display of 702, 704, and 706 at the same time in the view 700 facilitates quickly determining how the edits to the cross-sectional representation 702 affect the three-dimensional representation 704 and the pseudo log 706 so as to identify edits to the cross-sectional representation 702 in real time that results in the pseudo log 706 matching the actual formation measurements logged with drilling the well.

At 210, a signal may be output indicative of a match. The signal may be an audio, visual, and/or audio-visual alert on the display screen to indicate that an updated structural model is now available to the drill operator to geosteer. Geosteering is a process of control drilling in the formation, e.g., a direction and/or angle of the drilling, so that drilling remains within a formation layer defined by the geological surface and/or the drilling is directed to those formation layers with hydrocarbon deposits depicted by other formation layers. A drill operator may be using an earlier version of the structural model to geosteer the drill. Based on the signal, the geosteer may access the updated structural model, e.g., by clicking a link in a visual portion of the alert, for use in steering the drill bit. In this regard, accurate determination of a representation of the geological surface is essential to steering a direction of the drilling to maximize hydrocarbon extraction in formation layers of the formation. The signal indicative of the match may take other forms as well.

In some examples, the editing of the cross-sectional representation may involve applying a predefined variogram to further deform the cross-sectional representation to determine the geological surface in the formation. The variogram specifies a type of variability in the cross-sectional representation. The variogram may take the form of predefined shapes which are applied to the cross-sectional representation to produce the deformation. The predefined shapes may take the form of a cubic, exponential, gaussian, penta, and spherical shaped variograms among others. The variograms may be applied to the cross-sectional representation of the geological surface before, after, or during the editing of the segment to further deform the cross-sectional representation. The predefined shapes may be applied symmetrically around the control point or asymmetrically around the control point of the geological surface which is edited. Further, the predefined shapes may be rotated from 0 to 360 degrees as it is applied. The predefined shapes may deform the cross section in addition to editing of a segment. A resulting cross-sectional representation may then be used in the steps 206 to 208 to determine whether the edited geological surface is a better representation of the geological surface.

The above examples describe editing the segment associated with the cross-sectional representation. In other examples, the three-dimensional representation may be edited instead of or in addition to the cross-sectional representation. Further, the variograms may be applied to the three-dimensional representation. Other variations are also possible.

Figure 8:
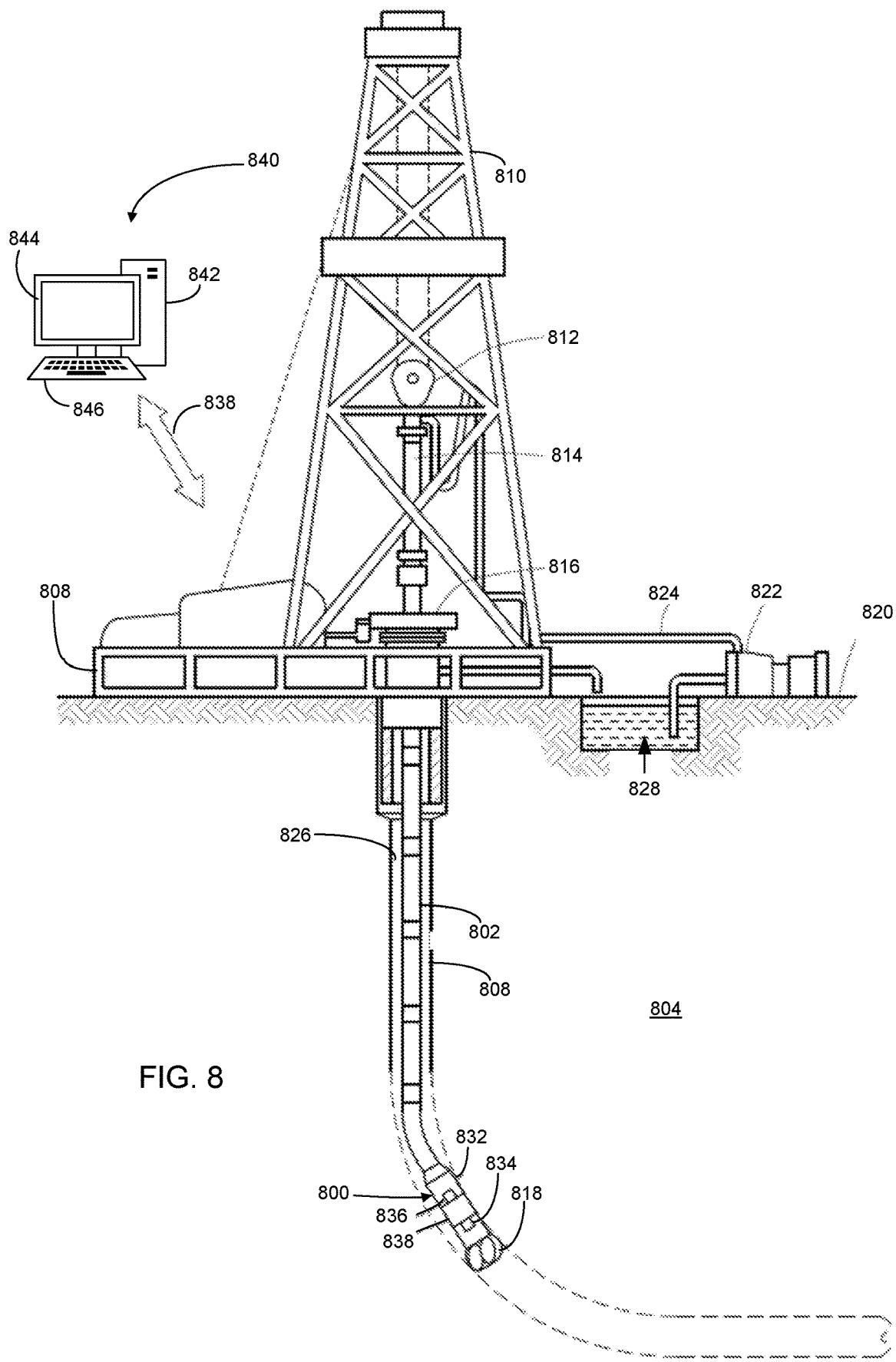
FIG. 8 is a schematic diagram of well apparatus.

FIG. 8 is a schematic diagram of an apparatus that can be used to perform some of the operations and functions described with reference to FIGS. 1-7. The apparatus includes a sampling tool 800 disposed on a drill string 802 of a depicted well apparatus. Sampling tool 800 may be used to obtain a sample such as a sample of a reservoir fluid from a subterranean formation 804. While wellbore 806 is shown extending generally vertically into the subterranean formation 804, the principles described herein are also applicable to wellbores that extend at an angle through the subterranean formation 804, such as horizontal and slanted wellbores. For example, although FIG. 8 shows a vertical or low inclination angle well, high inclination angle or horizontal placement of the well and equipment is also possible. It should further be noted that while FIG. 8 generally depicts a land-based operation, those skilled in the art will readily recognize that the principles described herein are equally applicable to subsea operations that employ floating or sea-based platforms and rigs, without departing from the scope of the disclosure.

The well apparatus further includes a drilling platform 808 that supports a derrick 810 having a traveling block 812 for raising and lowering drill string 802. Drill string 802 may include, but is not limited to, drill pipe and coiled tubing, as generally known to those skilled in the art. A kelly 814 may support drill string 802 as it may be lowered through a rotary table 816. A drill hit 818 may be attached to the distal end of drill string 802 and may be driven either by a downhole motor and/or via rotation of drill string 802 from the surface 820. Without limitation, drill bit 818 may include, roller cone bits, PDC bits, natural diamond bits, any hole openers, reamers, coring bits, and the like. As drill bit 818 rotates, it may create and extend wellbore 806 that penetrates various subterranean formations such as 804. A pump 822 may circulate drilling fluid through a feed pipe 824 to kelly 814, downhole through interior of drill string 802, through orifices in drill bit 818, back to surface 820 via annulus 826 surrounding drill string 802, and into a retention pit 828.

Drill bit 818 may be just one piece of a downhole assembly that may include one or more drill collars 830 and sampling tool 800. One or more of drill collars 830 may form a tool body 832, which may be elongated as shown on FIG. 8. Tool body 832 may be any suitable material, including without limitation titanium, stainless steel, alloys, plastic, combinations thereof, and the like. Sampling tool 800 may further include one or more sensors 834 for measuring properties of the fluid sample, reservoir fluid, wellbore 806, subterranean formation 804, or the like. As previously described, fluid samples collected by sampling tool 800 may comprise a reservoir fluid.

The sensors 834 may measure formation properties of the formation. Fluid analysis module 836 may further include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, fluid analysis module 836 may include random access memory (RAM), one or more processing units, such as a central processing unit (CPU), or hardware or software control logic, ROM, and/or other types of nonvolatile memory.

Any suitable technique may be used for transmitting signals from sampling tool 800 to a computing system residing on the surface 820. As illustrated, a communication link 838 (which may be wired or wireless, for example) may be provided that may transmit data from sampling tool 800 to an information handling system 840 at the surface 820. Communication link 838 may implement one or more of various known drilling telemetry techniques such as mud-pulse, acoustic, electromagnetic, etc. Information handling system 840 may include a processing unit 842, a monitor 844, an input device 846 (e.g., keyboard, mouse, etc.), and/or computer media 848 (e.g., optical disks, magnetic disks) that can store code representative of the methods described herein. Information handling system 840 may act as a data acquisition system and possibly a data processing system that analyzes information from sampling tool 800. For example, information handling system 840 may process the information from sampling tool 800 to determine formation properties which are used to form geological surfaces as described above, representations of which are then edited as described above. Information handling system 840 may also determine additional properties of the fluid sample (or reservoir fluid), such as component concentrations, pressure-volume-temperature properties (e.g., bubble point, phase envelop prediction, etc.) based on the chemical composition. This processing may occur at surface 820 in real-time. Alternatively, the processing may occur at surface 820 or another location after withdrawal of sampling tool 800 from wellbore 806. The resultant formation properties may then be transmitted to surface 820, for example, in real-time to determine formation properties which is used to visualize and edit geological surfaces as described above.

Figure 9:
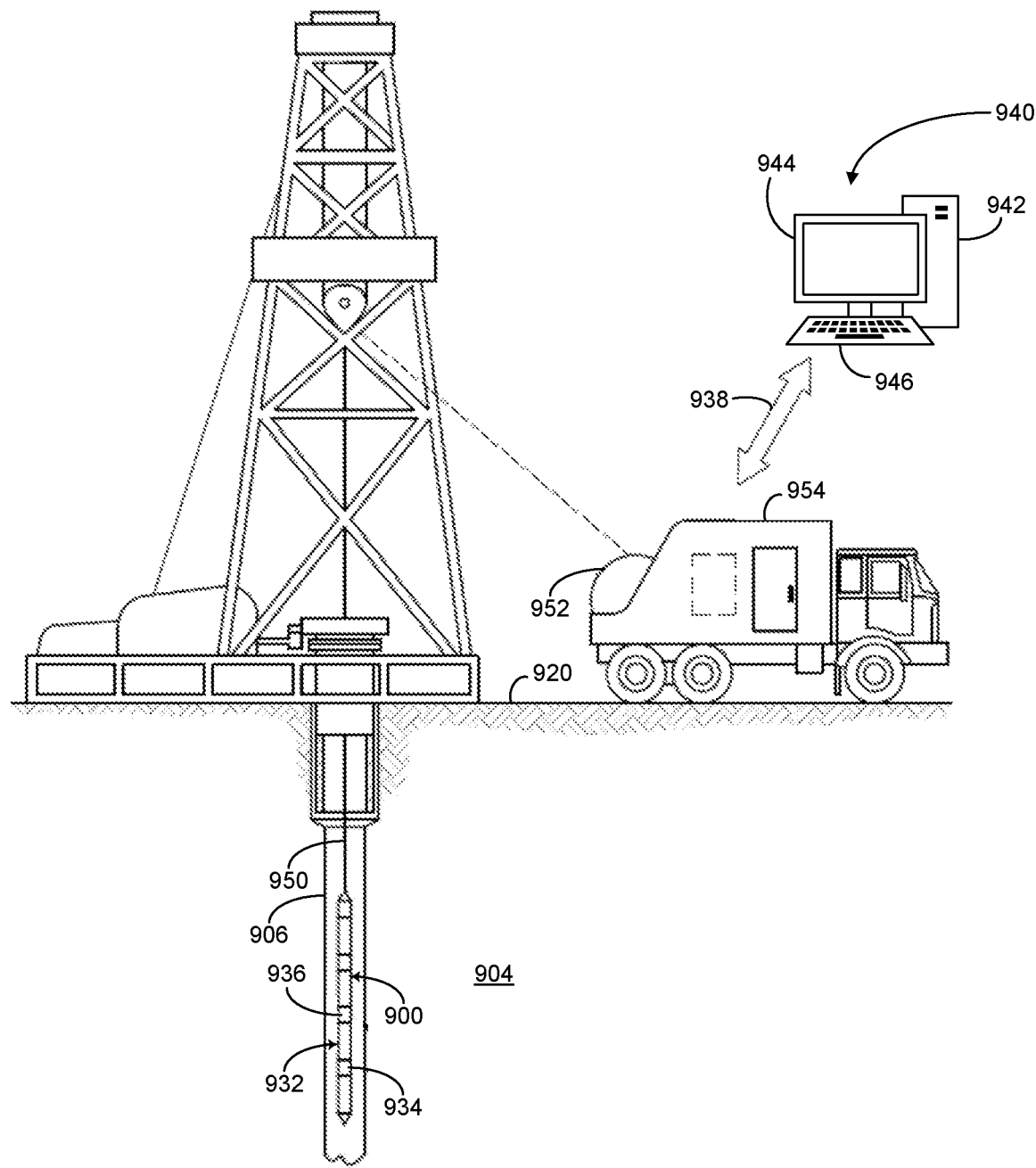
FIG. 9 is schematic diagram of another well apparatus.

Referring now to FIG. 9, a schematic diagram is shown of downhole sampling tool 900 on a wireline 950. As illustrated, a wellbore 906 may extend through subterranean formation 904. Downhole sampling tool 900 may be similar in configuration and operation to downhole sampling tool 900 shown on FIG. 8 except that FIG. 9 shows downhole fluid sampling tool 900 disposed on wireline 950. It should be noted that while FIG. 9 generally depicts a land-based drilling system, those skilled in the art will readily recognize that the principles described herein are equally applicable to subsea drilling operations that employ floating or sea-based platforms and rigs, without departing from the scope of the disclosure.

As illustrated, a hoist 952 may be used to run sampling tool 900 into wellbore 906. Hoist 952 may be disposed on a recovery vehicle 954. Hoist 952 may be used, for example, to raise and lower wireline 950 in wellbore 906. While hoist 952 is shown on recovery vehicle 954, it should be understood that wireline 950 may alternatively be disposed from a hoist 952 that is installed at surface 920 instead of being located on recovery vehicle 954. Downhole sampling tool 900 may be suspended in wellbore 906 on wireline 950. Other conveyance types may be used for conveying downhole sampling tool 900 into wellbore 906, including coiled tubing, wired drill pipe, slickline, and downhole tractor, for example. Downhole sampling tool 900 may comprise a tool body 932, which may be elongated as shown on FIG. 9. Tool body 932 may be any suitable material, including without limitation titanium, stainless steel, alloys, plastic, combinations thereof, and the like. Downhole sampling tool 900 may further include a fluid analysis module 836 to measure formation properties in the subterranean formation 804.

As previously described, information from sampling tool 900 may be transmitted to an information handling system 940, which may be located at surface 920. As illustrated, communication link 938 (which may be wired or wireless, for example) may be provided that may transmit data, e.g., an indication of the current output by the electromagnetic wave detector, from downhole sampling tool 900 to an information handling system 940 at surface 920. Information handling system 940 may include a processing unit 942, a monitor 844, an input device 946 (e.g., keyboard, mouse, etc.), and/or computer media 948 (e.g., optical disks, magnetic disks) that can store code representative of the methods described herein. In addition to, or in place of processing at surface 920, processing may occur downhole (e.g., fluid analysis module 936).

Figure 10:
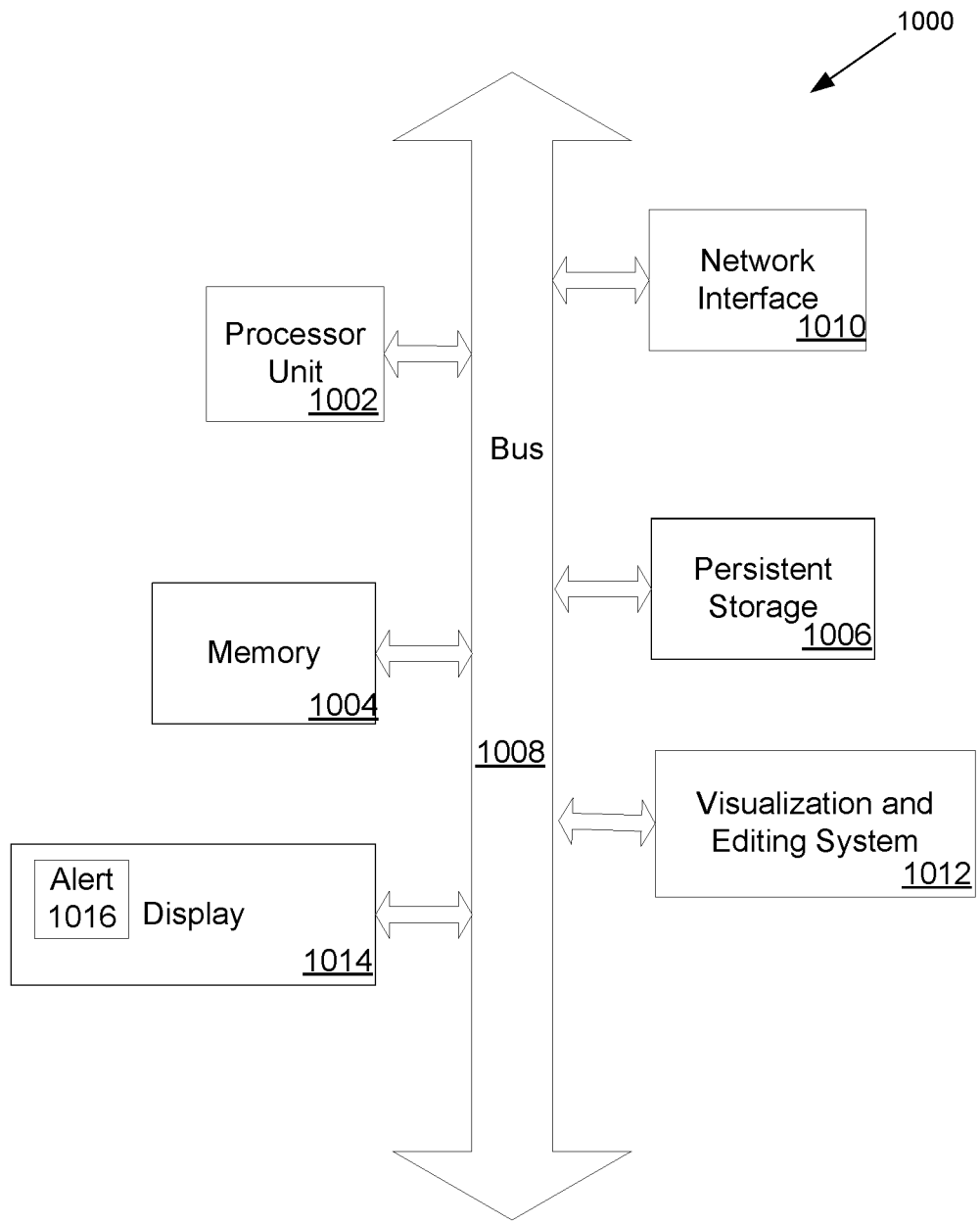
FIG. 10 is a block diagram of a visualization and editing system.

FIG. 10 is a block diagram of system 1000 (e.g., the computing system and/or drilling system) for determining a geological surface in a formation. The system 1000 may be located at a surface of a formation and/or downhole. In the case that the system 1000 is downhole, the system 1000 may be rugged, unobtrusive, can withstand the temperatures and pressures in situ at the wellbore.

The system 1000 includes a processor 1002 (possibly including multiple processors, multiple cores, multiple nodes, and/or implementing multi-threading, etc.). The system 1000 includes memory 1004. The memory 1004 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media.

The system 1000 may also include a persistent data storage 1006. The persistent data storage 1006 can be a hard disk drive, such as magnetic storage device. The computer device also includes a bus 1008 (e.g., PCI, ISA, PCI-Express, HyperTransport® bus, InfiniBand® bus, NuBus, etc.) and a network interface 1010 in communication with the sensor tool. The apparatus 1000 may have a visualization and editing system 1012 for determining a representation of a geological surface in a formation as described above.

Further, the system 1000 may further comprise a user input 1016 and display 1014. The user input 1016 may be a keyboard, mouse, and/or touch screen, among other examples, for receiving edits of the representation of the geological formation. The display 1014 may comprise a computer screen or other visual device which shows the representations of the geological surface. Additionally, the display 1014 may convey alerts 1018. The visualization and editing device 1012 may generate the alerts 1016 relating to whether a structural model of the formation is accurate such that it may be used by a drill operator to steer a drill bit through a formation layer associated with the geological surface.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, the operations depicted in blocks 302 to 314 can be performed in parallel or concurrently. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any non-transitory tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks. While the aspects of the disclosure are described with reference to various implementations and exploitations, it will be understood that these aspects are illustrative and that the scope of the claims is not limited to them. In general, techniques as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

Example Embodiments

Example embodiments include the following:

Embodiment 1: A method comprising: displaying a representation of a geological surface of a formation on a display screen; receiving an indication to edit the representation of the geological surface; determining a pseudo log of formation properties based on the indication to edit the representation of the geological surface; displaying the pseudo log on the display screen; determine that the formation properties indicated by the pseudo log match actual formation properties measured during drilling of a well in an area associated with the pseudo log; and outputting a signal indicative of the formation properties associated with the pseudo log matching the actual formation properties.

Embodiment 2: The method of Embodiment 1, further comprising steering a drill bit in the formation based on a structural model of the formation, the structural model determined based on the received indication to edit the representation of the geological surface.

Embodiment 3: The method of Embodiment 1 or 2, wherein receiving the indication to edit the representation of the geological surface comprises editing a segment of the representation of the geological surface.

Embodiment 4: The method of any one of Embodiments 1-3, wherein receiving an indication to edit the representation of the geological surface comprises defining two spline points on the representation of the geological surface and stretching the segment between the two spline points.

Embodiment 5: The method of any one of Embodiments 1-4, wherein receiving an indication to edit the representation of the geological surface comprises applying a variogram to the edited representation of the geological surface.

Embodiment 6: The method of any one of Embodiments 1-5, wherein the displayed pseudo log dynamically changes in real time based on the indication to edit.

Embodiment 7: The method of any one of Embodiments 1-6, wherein a cross sectional representation of the geological surface, and a three dimensional representation of the geological surface, and the pseudo log are together displayed on the display screen and change in real time based on the indication to edit.

Embodiment 8: One or more non-transitory machine-readable media comprising program code, the program code to: display a representation of a geological surface of a formation on a display screen; receive an indication to edit the representation of the geological surface; determine a pseudo log of formation properties based on the indication to edit the representation of the geological surface; display the pseudo log on the display screen; determine that the formation properties indicated by the pseudo log match actual formation properties measured during drilling of a well in an area associated with the pseudo log; and output a signal indicative of the formation properties associated with the pseudo log matching the actual formation properties.

Embodiment 9: The one or more non-transitory machine-readable media of Embodiment 8, further comprising steering a drill bit in the formation based on a structural model of the formation, the structural model determined based the received indication to edit the representation of the geological surface.

Embodiment 10: The one or more non-transitory machine-readable media of Embodiment 8 or 9, wherein the program code to receive the indication to edit the representation of the geological surface comprises program code to edit a segment of the representation of the geological surface.

Embodiment 11: The one or more non-transitory machine-readable media of any one of Embodiments 8-10, wherein program code to receive an indication to edit the representation of the geological surface comprises program code to define two spline points on the representation of the geological surface and stretching the segment between the two spline points.

Embodiment 12: The one or more non-transitory machine-readable media of any one of Embodiments 8-11, wherein the displayed pseudo log dynamically changes in real time based on the indication to edit.

Embodiment 13: The one or more non-transitory machine-readable media of any one of Embodiments 8-12, wherein a cross sectional representation of the geological surface, a three-dimensional representation of the geological surface, and the pseudo log are together displayed on the display screen and change in real time based on the indication to edit.

Embodiment 14: A system comprising: drilling apparatus; a processor; a display screen; and a machine readable medium having program code executable by the processor to cause the processor to: display a representation of geological surface on the display screen; receive an indication to edit the representation of the geological surface; determine a pseudo log of formation properties based on the indication to edit the representation; display the pseudo log on the display screen; determine that the formation properties indicated by the pseudo log match actual formation properties measured by the drilling apparatus during drilling of a well in an area associated with the pseudo log; and output a signal indicative of the formation properties associated with the pseudo log matching the actual formation properties.

Embodiment 15: The system of Embodiment 14, further comprising program code to steer a drill hit in the formation based on a structural model of the formation, the structural model determined based on the received indication to edit the representation of the geological surface.

Embodiment 16: The system of Embodiment 14 or 15, wherein the program code to receive the indication to edit the representation of the geological surface comprises program code to edit a segment of the representation of the geological surface.

Embodiment 17: The system of any one of Embodiments 14-16, wherein program code to receive an indication to edit the representation of the geological surface comprises program code to define two spline points on the representation of the geological surface and stretch the segment between the two spline points.

Embodiment 18: The system of any one of Embodiments 14-17, wherein the displayed pseudo log dynamically changes in real time based on the indication to edit.

Embodiment 19: The system of any one of Embodiments 14-18, wherein a cross sectional representation of the geological surface, a three-dimensional representation the geological surface, and the pseudo log are together displayed on the display screen and change in real time based on the indication to edit.

Embodiment 20: The system of any one of Embodiments 14-19, wherein the program code to facilitate the edit of the representation of the geological surface comprises program code to apply a variogram to an edited representation of the geological surface.

The invention claimed is:

1. A method for determining an improved representation of a geological surface of a formation, the method comprising:
   displaying a representation of the geological surface of the formation on a display screen, the geological surface identifying at least a portion of a boundary of a formation layer in the formation;
   receiving an indication to deform the representation of the geological surface;
   modifying the representation of the geological surface based on the indication to deform the representation of the geological surface to generate a modified representation of the geological surface;
   determining a pseudo log of formation properties based on the modified representation of the geological surface;
   displaying the pseudo log on the display screen;
   determining that the formation properties associated with the pseudo log match actual formation properties measured during drilling of a well in an area associated with the pseudo log; and
   outputting a signal indicative of the formation properties associated with the pseudo log matching the actual formation properties.

2. The method of claim 1, further comprising steering a drill bit in the formation based on a structural model of the formation, the structural model determined based on the modified representation of the geological surface.

3. The method of claim 1, wherein receiving the indication to deform the representation of the geological surface comprises editing a segment of the representation of the geological surface.

4. The method of claim 3, wherein editing the segment of the representation of the geological surface comprises defining two spline points on the representation of the geological surface and stretching the segment between the two spline points.

5. The method of claim 1, wherein receiving the indication to deform the representation of the geological surface comprises receiving an indication to apply a variogram to the modified representation of the geological surface.

6. The method of claim 1, wherein the displayed pseudo log dynamically changes in real time based on additional indications to deform the representation of the geological surface.

7. The method of claim 1, wherein a cross sectional representation of the geological surface, and a three dimensional representation of the geological surface, and the pseudo log are together displayed on the display screen and change in real time based on additional indications to deform the representation of the geological surface.

8. One or more non-transitory machine-readable media comprising program code, the program code to:
   display a representation of a geological surface of a formation on a display screen the geological surface identifying at least a portion of a boundary of a formation layer in the formation;
   receive an indication to deform the representation of the geological surface;
   modify the representation of the geological surface based on the indication to deform the representation of the geological surface to generate a modified representation of the geological surface;
   determine a pseudo log of formation properties based on the modified representation of the geological surface;
   display the pseudo log on the display screen;
   determine that the formation properties associated with the pseudo log match actual formation properties measured during drilling of a well in an area associated with the pseudo log; and
   output a signal indicative of the formation properties associated with the pseudo log matching the actual formation properties.

9. The one or more non-transitory machine-readable media of claim 8, further comprising steering a drill bit in the formation based on a structural model of the formation, the structural model determined based on the modified representation of the geological surface.

10. The one or more non-transitory machine-readable media of claim 8, wherein the program code to receive the indication to deform the representation of the geological surface comprises program code to edit a segment of the representation of the geological surface.

11. The one or more non-transitory machine-readable media of claim 10, wherein program code to edit the representation of the geological surface comprises program code to define two spline points on the representation of the geological surface and stretching the segment between the two spline points.

12. The one or more non-transitory machine-readable media of claim 8, wherein the displayed pseudo log dynamically changes in real time based on additional indications to deform the representation of the geological surface.

13. The one or more non-transitory machine-readable media of claim 8, wherein a cross sectional representation of the geological surface, a three-dimensional representation of the geological surface, and the pseudo log are together displayed on the display screen and change in real time based on additional indications to deform the representation of the geological surface.

14. A system comprising:
 drilling apparatus;
 a processor;
 a display screen; and
 a machine readable medium having program code executable by the processor to cause the processor to:
  display a representation of geological surface of a formation on the display screen the geological surface identifying at least a portion of a boundary of a formation layer in the formation;
  receive an indication to deform the representation of the geological surface;
  modify the representation of the geological surface based on the indication to deform the representation of the geological surface to generate a modified representation of the geological surface;
  determine a pseudo log of formation properties based on the modified representation of the geological surface;
  display the pseudo log on the display screen;
  determine that the formation properties associated with the pseudo log match actual formation properties measured by the drilling apparatus during drilling of a well in an area associated with the pseudo log; and
  output a signal indicative of the formation properties associated with the pseudo log matching the actual formation properties.

15. The system of claim 14, further comprising program code to steer a drill bit in the formation based on a structural model of the formation, the structural model determined based on the modified representation of the geological surface.

16. The system of claim 14, wherein the program code to receive the indication to deform the representation of the geological surface comprises program code to edit a segment of the representation of the geological surface.

17. The system of claim 16, wherein program code to edit the segment of the representation of the geological surface comprises program code to define two spline points on the representation of the geological surface and stretch the segment between the two spline points.

18. The system of claim 14, wherein the displayed pseudo log dynamically changes in real time based on additional indications to deform the representation of the geological surface.

19. The system of claim 14, wherein a cross sectional representation of the geological surface, a three-dimensional representation the geological surface, and the pseudo log are together displayed on the display screen and change in real time based on additional indications to deform the representation of the geological surface.

20. The system of claim 14, wherein the program code to receive the indication to deform the representation of the geological surface comprises program code to receive an indication to apply a variogram to the modified representation of the geological surface.

* * * * *